(12) United States Patent
Iizuka et al.

(10) Patent No.: US 6,760,007 B2
(45) Date of Patent: Jul. 6, 2004

(54) INPUT METHOD USING POINTING DEVICE AND PORTABLE INFORMATION TERMINAL WITH FUNCTION THEREOF

(75) Inventors: Shinji Iizuka, Yokohama (JP); Tomoaki Kondo, Ayase (JP); Hidetoshi Mori, Yamato (JP); Takashi Yomo, Fujisawa (JP)

(73) Assignee: International Business Machines Corporation, Armonk, NY (US)

( * ) Notice: Subject to any disclaimer, the term of this patent is extended or adjusted under 35 U.S.C. 154(b) by 226 days.

(21) Appl. No.: 10/021,924

(22) Filed: Dec. 13, 2001

(65) Prior Publication Data

US 2002/0075164 A1 Jun. 20, 2002

(30) Foreign Application Priority Data

Dec. 20, 2000 (JP) .................................... 2000-386857

(51) Int. Cl.[7] ................................................ G09G 5/08
(52) U.S. Cl. ...................... 345/157; 345/163; 345/856
(58) Field of Search ................................ 345/156–169, 345/856–862; 463/37–38; 273/148 B; 341/20–21, 27

(56) References Cited

U.S. PATENT DOCUMENTS

| | | | | | |
|---|---|---|---|---|---|
| 5,160,918 A | * | 11/1992 | Saposnik et al. | ............ | 345/709 |
| 5,268,674 A | * | 12/1993 | Howard et al. | ............. | 345/163 |
| 5,585,823 A | * | 12/1996 | Duchon et al. | ............. | 345/163 |
| 5,767,457 A | * | 6/1998 | Gerpheide et al. | ............ | 178/18 |
| 5,781,181 A | * | 7/1998 | Yanai et al. | ................ | 345/173 |
| 6,542,147 B2 | * | 4/2003 | Kobayashi | .................. | 345/156 |

\* cited by examiner

*Primary Examiner*—Lun-Yi Lao
(74) *Attorney, Agent, or Firm*—Carlos Munoz-Bustamante

(57) ABSTRACT

The present invention relates to an input method using the pointing device in which the pointing device's ON operation causes an application to recognize that the state of the pointing device has transitioned to an ON state and the pointing device's OFF operation causes the application to recognize that the state of the pointing device has transitioned to an OFF state. The input method includes responding to the ON operation of the pointing device maintained in a certain period and bringing about a latch state in which the pointing device remains in the ON state for the application even if the OFF operation of the pointing device has taken place; and executing a program for informing a user that the latch state has been brought about.

8 Claims, 4 Drawing Sheets

INPUT METHOD USING POINTING DEVICE AND PORTABLE INFORMATION TERMINAL WITH FUNCTION THEREOF

BACKGROUND OF THE INVENTION

The present invention relates to an input method using a pointing device that can have an ON state enabling an operation of the pointing device (e.g. a state in which a button of a mouse is pressed) and an OFF state disabling an operation of the pointing device (e.g. a state in which a button of a mouse is released), and relates to a portable information terminal or unit having this input function.

Among pointing devices that can have an ON state enabling an operation of the pointing devices and an OFF state disabling an operation of the pointing devices, a pointing device is conventionally known that can have a latch state locking an operation by maintaining the ON state for a certain period.

For example, Windows Me of Microsoft Corporation (Microsoft and Windows Me are trademarks of Microsoft Corporation) employs so-called, ClickLock function. When a user who has pressed and held a mouse button for a certain period, the ClickLock function emulates the state of the button as a software function as if the button were still pressed even after the button is released (the latch state) until it is pressed again. Generally, when an object is dragged on a display, a compound operation of moving the mouse pointer while pressing the mouse button is needed. However, the ClickLock function allows easy dragging by separate operations of pressing the mouse button and moving the mouse pointer, whereby facilitating dragging performed by users who do not have full use of their fingers.

The current ClickLock function of Windows Me, however, does not provide any feedback indicating that an operation has transitioned to the locked state, although it is possible to set the period from when the mouse button is pressed to when an operation transitions to the locked state. As a result, the user may fail to properly operate his/her mouse such that he/she releases the mouse button before locking an operation although he/she had pressed and held the mouse button with the intention of locking the operation. Thus, to avoid this problem, the user has had to press and hold the mouse button for a period much longer than the preset period to prevent the wrong operation. Further, the user has also had to determine the pressing period all by his/her self.

The purpose of the present invention is to provide an input method using a pointing device that solves the above mentioned problems and to provide a portable information terminal having this input mechanism, the pointing device allowing accurate recognition of the latch state of the pointing device whereby being capable of eliminating the wrong operation upon transition to the latch state.

SUMMARY OF THE INVENTION

An input method using a pointing device of the present invention involves an input method using the pointing device, in which the pointing device's ON operation causes an application to recognize that the state of the pointing device has transitioned to an ON state and the pointing device's OFF operation causes the application to recognize that the state of the pointing device has transitioned to an OFF state. The input method includes the steps of: in response to the continuous ON operation of the pointing device over a certain period, bringing about a latch state in which the pointing device remains in the ON state for the application even if the OFF operation of the pointing device is taken place; and executing programs for informing the user that the latch state has been brought about.

The present invention employs the above configuration to inform the user that the state of the pointing device has transitioned to the latch state upon the transition to the latch state, and to emulate the latch state of the operation of the pointing device for other applications. This enables the user to accurately know the period for which the user should maintain the ON state, specifically the timing when the user may release the mouse button for example, thereby preventing wrong operation. Further, it is no more required to maintain the ON state for more than necessary period, specifically to press and hold the mouse button for more than necessary period, for example.

As a preferable embodiment of the present invention, duration of an operation of the pointing device is measured by starting a timer upon transition of the operation of the pointing device to the ON state and by stopping the timer upon transition of the operation of the pointing device to the OFF state, then, if the measured duration is equal to or more than a certain period that is preset to cause transition to the latch state, it is determined that the latch state which locks the operation of the pointing device has brought about. This embodiment is preferable as it allows the user to accurately determine the latch state.

As another preferable embodiment of the present invention, a user is informed that the latch state has been brought about by sound such as a beep or a chime, or visually by display of the state of the pointing device in a window on the display. Either embodiment is preferable since users, in particular hearing impaired or visually impaired users, are more accurately informed that the pointing device is in the latch state.

A portable information terminal of the present invention is provided with a function of informing a user of the latch state of the pointing device and emulating the latch state of the pointing device for other applications in accordance with the above mentioned input method using the pointing device. This portable information terminal allows the user to accurately recognize the latch state of the pointing device.

BRIEF DESCRIPTION OF THE DRAWINGS

Some of the objects and advantages of the invention have been stated, other objects will appear as the description proceeds, when taken in connection with the accompanying drawings, in which.

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
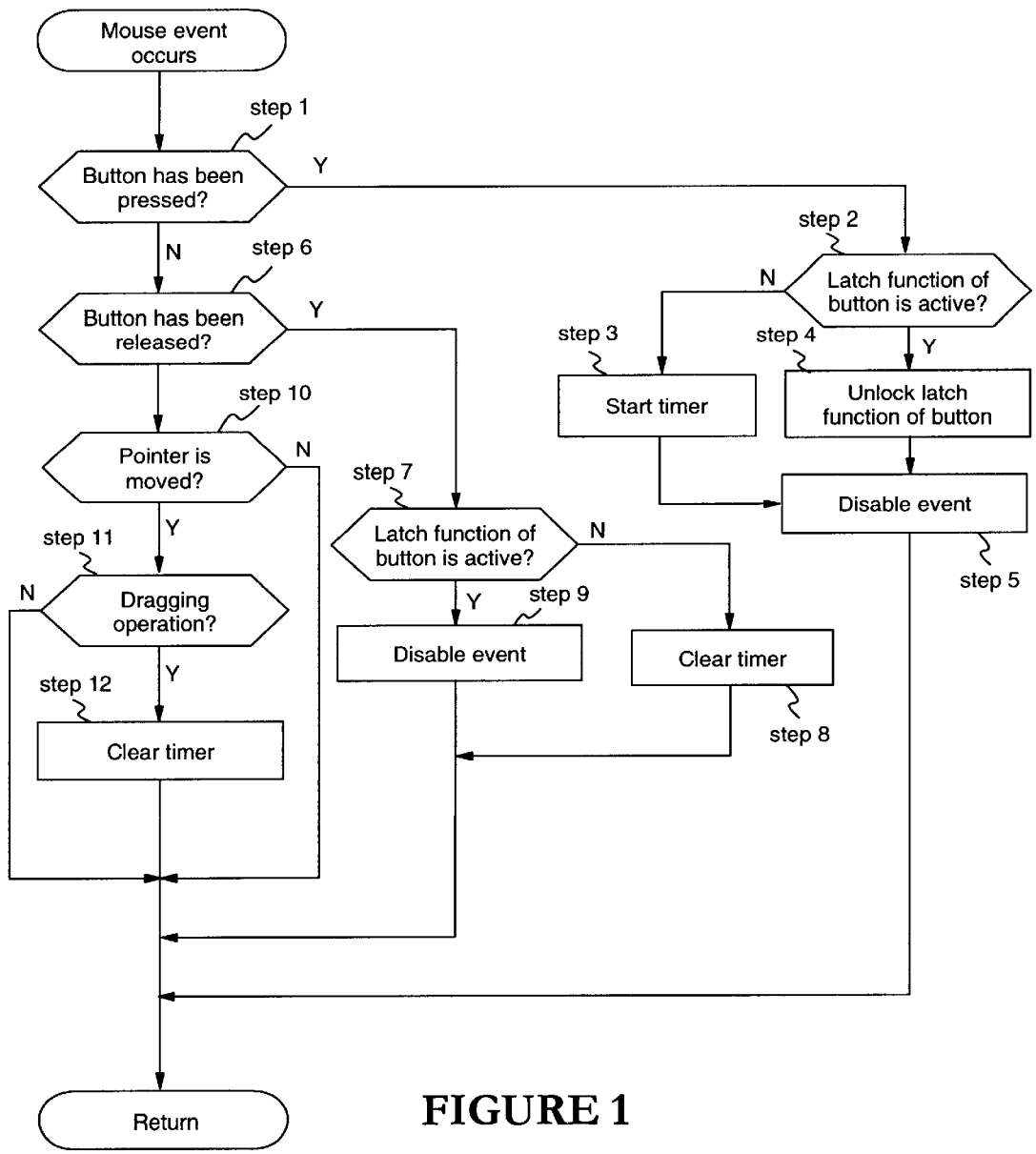
FIG. 1 is a flow chart for explaining an exemplary input method using a pointing device of the present invention taking a mouse as an example.

Referring now more particularly to the accompanying drawings, FIG. 1 is a flow chart to for explaining an exemplary input method using a pointing device of the present invention taking a mouse as an example. Here, events of the mouse are the following operations: pressing the mouse button (which enables an operation of the mouse), releasing the mouse button (which disables an operation of the mouse), and moving the mouse (which includes dragging). Although this embodiment is described taking a mouse as an example of the pointing device, the present invention may be also provided using various pointing devices such as a digitizer pen, a track ball, and a TrackPoint (TrackPoint is a trademark of IBM Corporation) which change frequency at the time of being pressed. In FIG. 1, when a mouse event has occurred, first it is checked whether the button has been pressed or not (step 1). If the button has been pressed, it is further checked whether a button is in a latch state or not (step 2). If the button is not in the latch state, a timer is started (step 3) and the process returns to the main routine. If the latch button is in the latch state, the latch state of the button is canceled (step 4) and the event is disabled (step 5), then the process returns to the main routine.

Now, if the button has not been pressed in step 1, it is further checked whether the button has been released or not (step 6). If the button has been released, it is further checked whether the button is in the latch state or not (step 7). If the button is not in the latch state, the timer is cleared (step 8) and the process returns to the main routine. If the button is in the latch state, the event is disabled (step 9) and the process returns to the main routine. If the button has not been released in step 6, it is further checked whether the pointer has been moved or not (step 10). Here, if the pointer has not been moved, the process returns to the main routine. If the pointer has been moved, it is further checked whether a dragging operation has been performed or not (step 11). Here, if a dragging operation has not been performed, the process returns to the main routine. If a dragging operation has been performed, the timer is cleared (step 12) and the process returns to the main routine.

Figure 2:
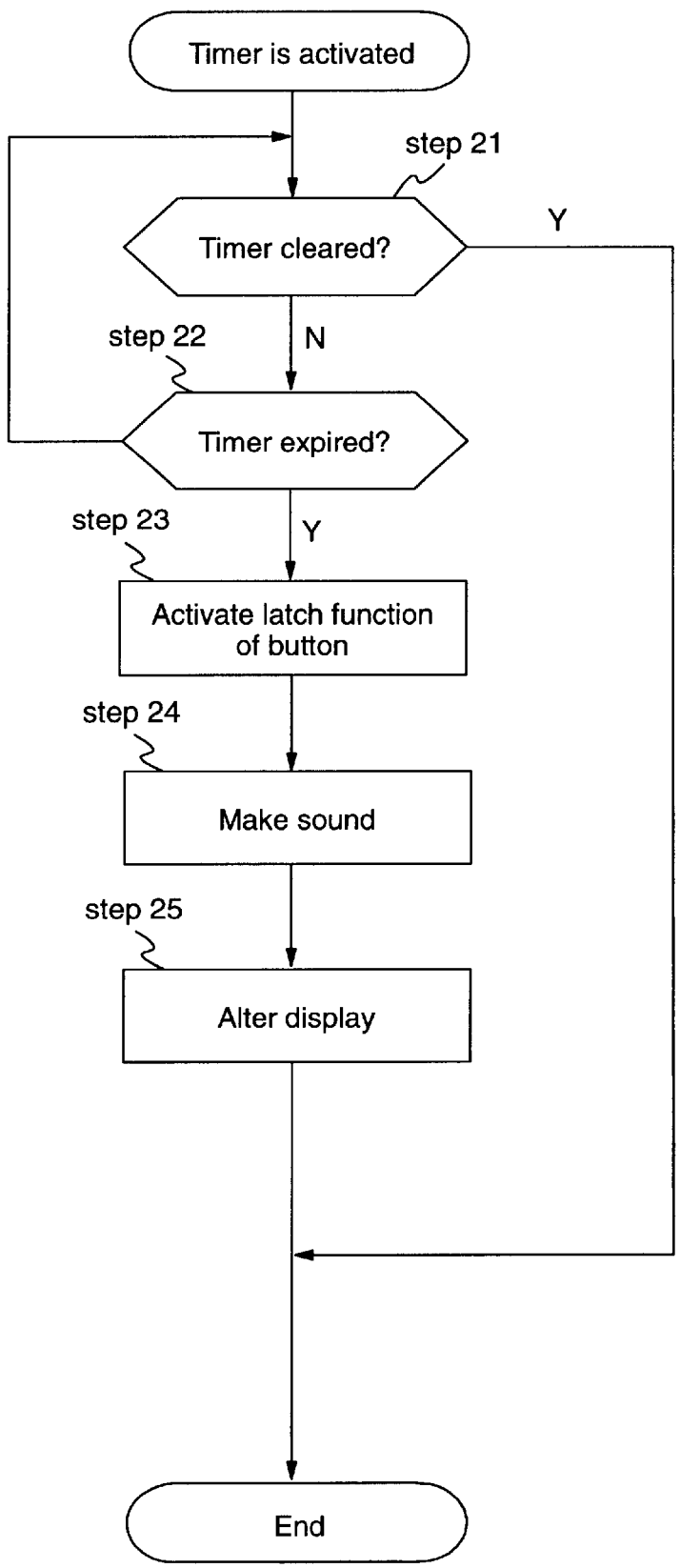
FIG. 2 is a flow chart for explaining the operation performed when the timer is activated.

FIG. 2 is a flow chart for explaining the operation performed while the timer is activated in the routine of the present invention shown as the flow chart in FIG. 1. In FIG. 2, when the timer has been started, it is first checked whether the timer has been cleared or not (step 21). Here, if the timer has been cleared, the routine is terminated. If the timer has not been cleared, it is further checked whether or not the timer is expired, exceeding a certain period of time that is preset to cause the latch state (step 22). Here, if the timer is not expired yet, the process returns to step 21. If the timer is expired, the latch function of the button is activated (step 23), then a program to make a sound of a beep or chime is executed (step 24) and a program to display an indication of the transition to the latch state is executed (step 25) so that the user is informed that the state has transitioned to the latch state. Then, the routine is terminated. In this way, the input method using the pointing device of the present invention can be provided by the combination of the routines shown as the flow charts in FIGS. 1 and 2. Programs to hook the mouse events and to emulate the latch state can be developed by using standard programming interfaces.

Although the example shown in FIGS. 1 and 2 has been described taking a mouse as an example of the pointing device, the present invention can be also suitably applied to the known pointing devices other than a mouse. Further, although the example shown in FIGS. 1 and 2 has been described taking the dragging as an example of the mouse operations, the present invention can be also suitably applied to functions that are specific to respective pointing devices, for example the center button of TrackPoint (trademark of IBM Corporation) for scrolling through a window in which a pointer resides. In addition, although the example shown in FIGS. 1 and 2 makes a sound to inform the user of the transition to the latch state, it is also possible to display a virtual pointing device window to inform the user of the transition to the latch state by coloring the button on the screen red, for example.

Figure 3:
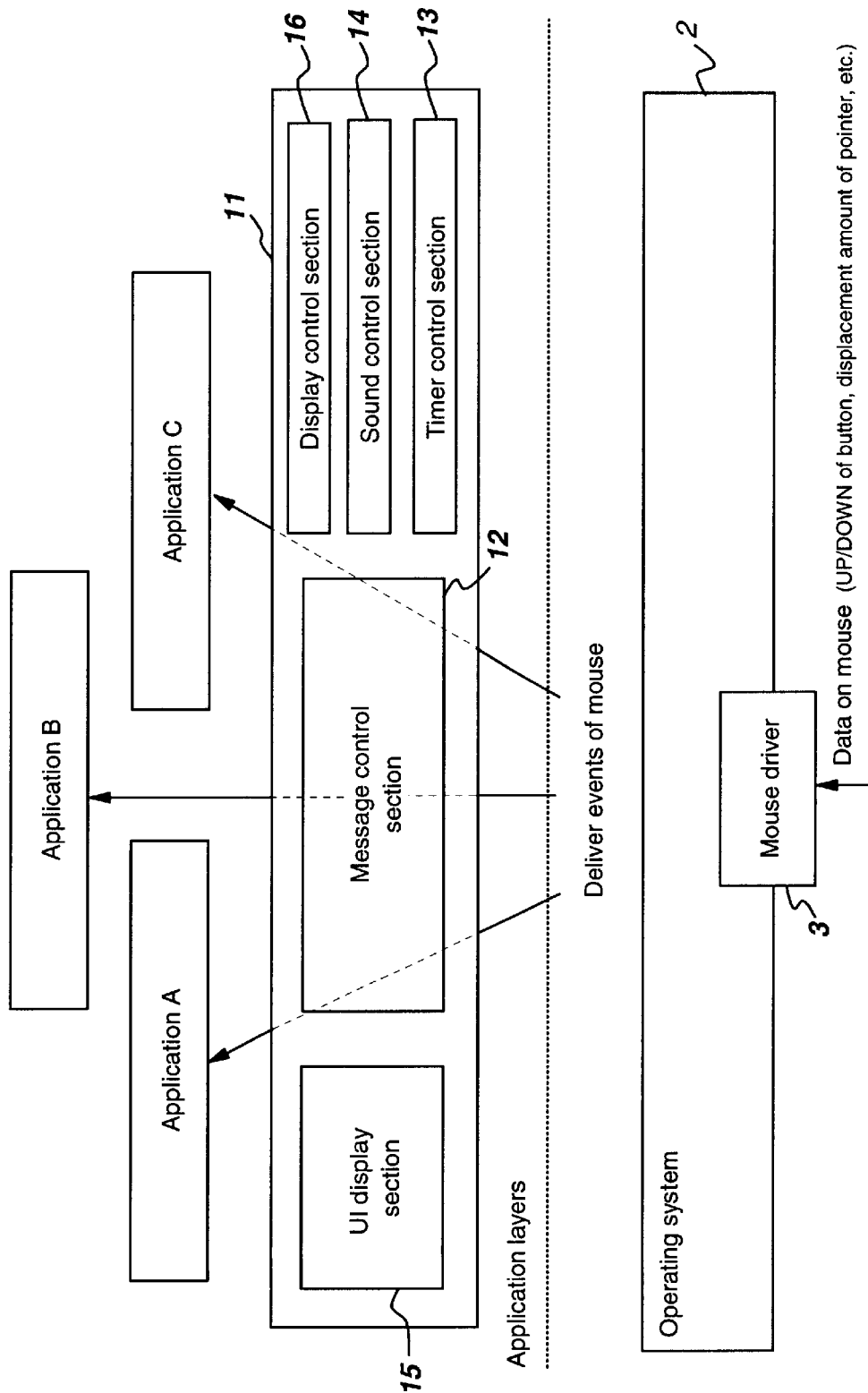
FIG. 3 is a block diagram showing an example of a portable information terminal, for example a notebook personal computer, which realizes the input method using a pointing device of the present invention.

FIG. 3 is a block diagram showing an example of a portable information terminal, for example a notebook personal computer or the like, which implements the method for recognizing the latch state of the pointing device of the present invention. In the example shown in FIG. 3, data indicating an event of a mouse 1 (UP/DOWN of the button, displacement amount of the pointer, etc.) is supplied to a mouse driver 3 provided in an operating system 2. The mouse driver 3, which has been supplied with the data on the mouse 1, informs various applications residing in application layers, e.g. application A, application B, and application C, of the event of the mouse 1 under the control of the operating system 2. A mouse latch state recognition section 11 is provided at the bottom layer of the application layers for constantly monitoring the events of the mouse 1, controlling determination of whether an event of the mouse 1 is to be informed/communicated or not, and informing the user that the state has transitioned to the latch state.

In the example shown in FIG. 3, the mouse latch state recognition section 11 consists of a message control section 12, a timer control section 13, a sound control section 14, UI display section 15, and a display control section 16. Here, the message control section 12 has a function of hooking messages associated with the mouse and checking events of the mouse. Further, it realizes the latch function of the mouse button by disabling a portion of the messages (UP/DOWN of the button) that would be delivered to the other applications. The timer control section 13 has a function of determining the timing when the mouse button is brought to the latch state. The message control section 13 "starts/clears" the timer when the message control section recognizes that the button has been "pressed/released". The sound control section gives the user feedback by sound that the mouse button is in the latch state. The UI display section 15 displays a setting panel for controlling the settings such as the period till the mouse button is brought to the latch state and for controlling user feedback, whether ON or OFF, of a sound or other indicia to indicate the latch state, and finally it manages the setting information. The display control section 16 displays an indication that the mouse button has been in the latch state. Various forms of display can be employed including displaying an icon that represents the latch state and disappears upon unlocking the latch state, changing the shape or color of a selected icon, and changing the display (shape, color) of a certain part on the display screen.

Figure 4:
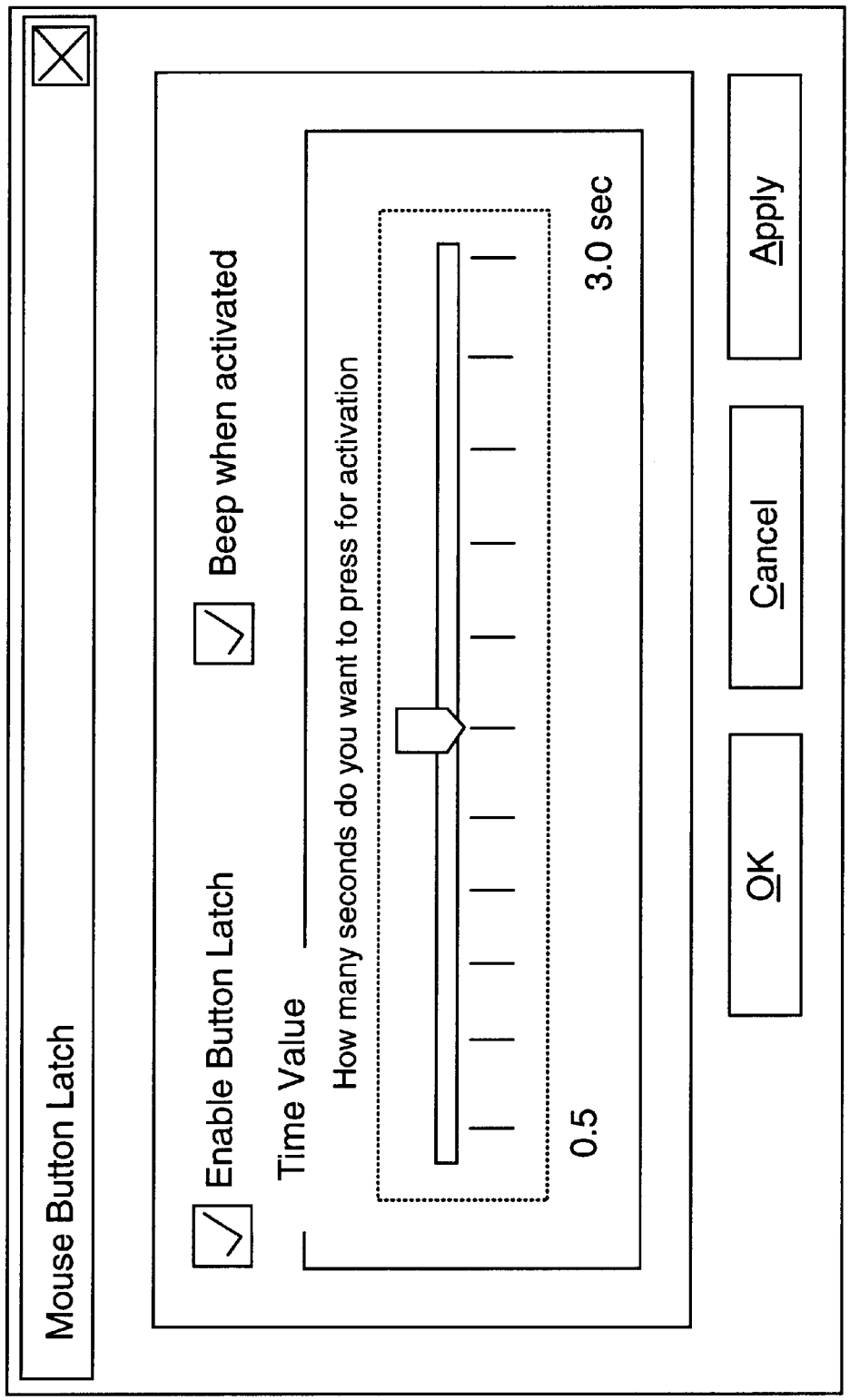
FIG. 4 shows an example of a setting panel that a UI display section displays on a screen.

FIG. 4 shows an example of the setting panel that the UI display section 15 displays on the screen. In the example shown in FIG. 4, the setting panel displayed on the screen includes a button to set the enabling or disabling the latch function, a button to set the enabling or disabling the beep for informing the user, and a slider to set the time before transition to the latch state. Even if the beep function is disabled, transition to the latch state can be informed to the user by showing a window that indicates the state of the mouse on the screen, in which the present invention can be also achieved.

As apparent from the above description, the present invention informs the user that the state of the pointing device has transitioned to the latch state upon its transition to the latch state, and to emulate the latch state of the operation of the pointing device for other applications. This enables the user to accurately know the period for which the user should maintain the ON state, specifically the timing of when the user may release the mouse button for example, thereby preventing wrong operation. Further, it is not thereafter required to maintain the ON state for more than the necessary period, specifically to press and hold the mouse button for more than the necessary period, for example.

In the drawings and specifications there has been set forth a preferred embodiment of the invention and, although specific terms are used, the description thus given uses terminology in a generic and descriptive sense only and not for purposes of limitation.

We claim as our invention:

1. An input method comprising the steps of:
   reporting to an application an emulated latch state in response to continuous ON operation of a pointing device beyond a predetermined period, said emulated latch state emulating the ON state for the application even when the OFF operation of the pointing device has taken place; and
   providing humanly perceivable indicia that said emulated latch state exists;
   wherein operation of the pointing device is measured by starting a timer upon transition of the operation of the pointing device to the ON state and by stopping the timer upon transition of the operation of the pointing device to the OFF state.

2. The input method according to claim 1, wherein said humanly perceivable indicia is a sound.

3. The input method using a pointing device according to claim 1, wherein said humanly perceivable indicia is visible.

4. The input method according to claim 1, further comprising the steps of:
   detecting, while the operation of the pointing device is in said emulated latch state, that the operation of the pointing device has again transitioned to the ON state; and
   terminating, based on said detection, said emulated latch state.

5. A computer system comprising:
   a pointing device port which accepts ON/OFF signals provided by a pointing device, the ON/OFF signals being indicative of pointing device ON/OFF operation; and
   a pointing device latch state recognition routine which monitors said port for the state of the ON/OFF signals and reports signal state information to any application requesting such state information;
   said recognition routine being effective to:
      report to the application an emulated latch state in response to a continuous ON signal over a predetermined time period, said emulated latch state emulating an ON state for the application even when any OFF signal has taken place; and
      provide humanly perceivable indicia that said emulated latch state exists;
   wherein said continuous ON signal is measured by starting a timer upon transition to said ON state and by stopping the timer upon detection of any OFF signal.

6. The computer system according to claim 5, wherein said humanly perceivable indicia is a sound.

7. The computer system according to claim 5, wherein said humanly perceivable indicia is visible.

8. The computer system according to claim 5, wherein said recognition routine is further effective to:
   detect, while in said emulated latch state, that a subsequent ON signal has again transitioned to the ON state; and
   terminate, based on said detection, said emulated latch state.

* * * * *